United States Patent
Kern et al.

(10) Patent No.: US 8,633,662 B2
(45) Date of Patent: Jan. 21, 2014

(54) DRIVE METHOD TO MINIMIZE VIBRATION AND ACOUSTICS IN THREE PHASE BRUSHLESS DC (TPDC) MOTORS

(75) Inventors: Lynn R. Kern, Tucson, AZ (US); James P. McFarland, Tucson, AZ (US)

(73) Assignee: Standard Microsystems Corporation, Hauppauge, NY (US)

( * ) Notice: Subject to any disclaimer, the term of this patent is extended or adjusted under 35 U.S.C. 154(b) by 898 days.

(21) Appl. No.: 12/632,495

(22) Filed: Dec. 7, 2009

(65) Prior Publication Data

US 2010/0315029 A1    Dec. 16, 2010

Related U.S. Application Data

(60) Provisional application No. 61/186,623, filed on Jun. 12, 2009.

(51) Int. Cl.
*H03K 5/00* (2006.01)
(52) U.S. Cl.
USPC ............. 318/400.13; 318/400.1; 318/400.29; 318/400.32; 318/400.38; 318/811
(58) Field of Classification Search
USPC ............... 318/400.13, 400.1, 400.32, 400.38, 318/400.29, 811
See application file for complete search history.

(56) References Cited

U.S. PATENT DOCUMENTS

| | | |
|---|---|---|
| 4,259,630 A | 3/1981 | Killian |
| 4,417,234 A | 11/1983 | McKenna |
| 4,509,004 A | 4/1985 | Shepard, Jr. |
| 4,510,422 A | 4/1985 | Ogura |
| 4,573,037 A | 2/1986 | Robinton et al. |
| 4,678,973 A | 7/1987 | Elliott et al. |
| 4,779,034 A | 10/1988 | Shepard, Jr. |
| 5,017,845 A | 5/1991 | Carobolante et al. |
| 5,198,733 A | 3/1993 | Wright |
| 5,315,225 A | 5/1994 | Heinrich et al. |
| 5,343,127 A | 8/1994 | Maiocchi |
| 5,350,984 A | 9/1994 | Carobolante et al. |
| 5,397,972 A | 3/1995 | Maiocchi |

(Continued)

OTHER PUBLICATIONS

Silicon Monolithic Integrated Circuit: Three-Phase Full-Wave Motor Driver for Fan Motor, BH6713NUV, Rohm Co., Ltd, 2008 , 4 pages.

(Continued)

*Primary Examiner* — Erick Glass
(74) *Attorney, Agent, or Firm* — King & Spalding L.L.P.

(57) ABSTRACT

A control method for a sensor-less, brushless, three-phase DC motor. The effects of commutation on the motor may be minimized using a sinusoidal current drive on each electromagnet. The "off" times and/or the "on" times of the drive transistors controlling the electromagnets in a full "H-bridge" configuration drive scheme may be delayed. By overlapping the drive signals to the electromagnets with respect to a commutation command, the effects of switching between electromagnets may be minimized. In addition, the "on" and "off" times may also be adjusted during the overlapping to further ensure that the coils continuously conduct current, and that the current does not change direction during the switching. The delays, and hence the overlap times of the coil drive signals may be dynamically controlled, for example by using digital timers, making the response predictable and easily controlled. The present position of the rotor in the motor may be determined using Hall sensors configured in the motor, or it may be determined using the un-energized electromagnets in a motor without Hall sensors.

23 Claims, 13 Drawing Sheets

(56) References Cited

U.S. PATENT DOCUMENTS

| | | | |
|---|---|---|---|
| 5,455,885 | A | 10/1995 | Cameron |
| 5,572,097 | A | 11/1996 | Cameron |
| 5,614,797 | A | 3/1997 | Carobolante |
| 5,654,620 | A * | 8/1997 | Langhorst .................. 318/716 |
| 5,668,449 | A | 9/1997 | Carobolante |
| 5,731,670 | A | 3/1998 | Galbiati et al. |
| 5,818,192 | A | 10/1998 | Nozari |
| 5,818,674 | A * | 10/1998 | Zuzuly ........................ 361/78 |
| 5,847,521 | A * | 12/1998 | Morikawa et al. ....... 318/400.01 |
| 5,907,299 | A | 5/1999 | Green et al. |
| 5,929,577 | A | 7/1999 | Neidorff et al. |
| 6,100,656 | A | 8/2000 | El-Sadi et al. |
| 6,441,572 | B2 | 8/2002 | Batzel |
| 6,473,562 | B1 | 10/2002 | Stephan |
| 6,512,342 | B2 | 1/2003 | Kawagoshi |
| 6,586,898 | B2 | 7/2003 | King et al. |
| 6,639,371 | B2 | 10/2003 | Walters et al. |
| 6,642,681 | B2 | 11/2003 | Kawabata et al. |
| 6,650,082 | B1 | 11/2003 | Du |
| 6,826,499 | B2 | 11/2004 | Colosky et al. |
| 6,940,235 | B2 | 9/2005 | Getz et al. |
| 6,995,530 | B2 | 2/2006 | Biamonte et al. |
| 7,054,980 | B2 | 5/2006 | Wurzburg |
| 7,071,651 | B2 | 7/2006 | Toyozawa et al. |
| 7,096,134 | B2 | 8/2006 | Miller, Jr. |
| 7,158,067 | B2 | 1/2007 | Lauritzen et al. |
| 7,183,734 | B2 | 2/2007 | Lassen |
| 7,184,927 | B2 | 2/2007 | Anghel et al. |
| 7,202,623 | B2 | 4/2007 | Zhou et al. |
| 7,352,311 | B2 | 4/2008 | Miller et al. |
| 7,432,677 | B2 | 10/2008 | Heydt et al. |
| 7,592,761 | B2 | 9/2009 | MacKay |
| 7,612,702 | B2 | 11/2009 | Danesh |
| 2001/0048278 | A1 | 12/2001 | Young et al. |
| 2002/0105293 | A1* | 8/2002 | Harlan .......................... 318/254 |
| 2004/0148076 | A1* | 7/2004 | Kodama et al. ................. 701/41 |
| 2005/0073281 | A1* | 4/2005 | Kerlin et al. .................. 318/749 |
| 2007/0152624 | A1* | 7/2007 | Hamaoka et al. ............. 318/805 |
| 2007/0216244 | A1 | 9/2007 | Edelson |
| 2008/0297081 | A1 | 12/2008 | Morita et al. |
| 2009/0049463 | A1 | 2/2009 | Ueda |
| 2009/0049464 | A1 | 2/2009 | Kang |
| 2009/0096397 | A1 | 4/2009 | Paintz et al. |

OTHER PUBLICATIONS

Fan Motor Driver—LV8800V; Sanyo Semiconductor Co., Ltd; Aug. 2007; 8 pages.

8904. 3-Phase Brushless DC Motor Controller/Driver With Back-EMF Sensing; Allegro Microsystems, Inc.; Oct. 31, 2006; 18 pages.

Ken Berringer, Bill Lucas, Leos Chalupa, and Libor Prokop; "Sensorless Brushless DC Motor Using the MC68HC908MR32 Embedded Motion Control Development System—AN 1858"; Freescale Semiconductor; 2004; 36 pages.

XC164CM—Driving of a Brushless DC Motor without Sensors—AP 16090; Infineon Technologies; 2006; 75 pages.

IRMCF371—Sensorless Motor Control IC for Appliances; International Rectifier; Dec. 5, 2006. 30 pages.

Jorge Zambada; "AN1078—Sensorless Field Oriented Control of PMSM Motors"; Microchip Technology Inc.; 2007; 30 pages.

Sensorless Spindle Motor Controller—ML4411/ML4411A; Micro Linear; May 1997; 15 pages.

TDA5140A—Brushless DC Motor Drive Circuit; Philips Semiconductors; Apr. 1994; 24 pages.

Brushless Motor Driver with Speed Control for Portable Cassette Recorders—LB1877V; Sanyo Electric Co., Ltd.; Aug. 1999; 7 pages.

Sensorless Brushless DC Motor Reference Design—AN208; Silicon Laboratories; 2006; 40 pages.

Autonomous Three Phase Fan Controller—EMC3000; Standard Microsystems Corporation; 2006; 8 pages.

An Introduction to Sensorless Brushless DC Motor Drive Applications with the ST72141—AN1130; ST Microelectronics; 2000; 29 pages.

3-Phase Full-Wave Sensorless Controller for Brushless DC Motors—TB6537P/PG, TB6537F/FG; Toshiba; Aug. 4, 2003; 17 pages.

Sensorless Brushless DC Motor Control with Z8 Encore! MC Microcontrollers—AN022601-0905; ZiLOG; 2005; 64 pages.

* cited by examiner

DRIVE METHOD TO MINIMIZE VIBRATION AND ACOUSTICS IN THREE PHASE BRUSHLESS DC (TPDC) MOTORS

PRIORITY CLAIM

This application claims benefit of priority of provisional application Ser. No. 61/186,623 titled "Drive Method to Minimize Vibration and Acoustics In Three Phase Brushless DC (TPDC) Motors", filed on Jun. 12, 2009, whose inventor is Lynn R. Kern, and which is hereby incorporated by reference as though fully and completely set forth herein.

BACKGROUND OF THE INVENTION

1. Field of the Invention

The invention generally relates to DC (Direct Current) motors used in various applications, such as hard disk drive motors, cooling fans, drive motors for appliances, etc.

2. Description of the Related Art

Electric motors are used to produce mechanical energy from electrical energy, used in a number of applications, including different household appliances, pumps, cooling fans, etc. Electric motors are generally classified as either alternating current (AC) motors or direct current (DC) motors.

Motors generally include a rotor, which is the non-stationary (moving) part of the motor, and a stator, which is the stationary part of the motor. The stator generally operates as a field magnet (e.g., electromagnet), interacting with an armature to induce motion in the rotor. The wires and magnetic field of the motor (typically in the stator) are arranged so that a torque is developed about the rotor's axis, causing rotation of the rotor. A motor typically also includes a commutator, which is an electrical switch that periodically reverses the current direction in the electric motor, helping to induce motion in the rotor. The armature carries current in the motor and is generally oriented normal to the magnetic field and the torque being generated. The purpose of the armature is to carry current crossing the magnetic field, thus creating shaft torque in the motor and to generate an electromotive force (EMF).

In a typical brushed DC motor, the rotor comprises one or more coils of wire wound around a shaft. Brushes are used to make mechanical contact with a set of electrical contacts (called the commutator) on the rotor, forming an electrical circuit between the DC electrical source and the armature coil-windings. As the armature rotates on an axis, the stationary brushes come into contact with different sections of the rotating commutator. The commutator and brush system form a set of electrical switches, each firing in sequence, such that electrical-power always flows through the armature coil closest to the stationary stator (permanent magnet). Thus an electrical power source is connected to the rotor coil, causing current to flow and producing electromagnetism. Brushes are used to press against the commutator on the rotor and provide current to the rotating shaft. The commutator causes the current in the coils to be switched as the rotor turns, keeping the magnetic poles of the rotor from ever fully aligning with the magnetic poles of the stator field, hence maintaining the rotation of the rotor. The use of brushes creates friction in the motor and leads to maintenance issues and reduced efficiency.

In a brushless DC motor, the commutator/brush-gear-assembly (which is effectively a mechanical "rotating switch") is replaced by an external electronic switch that's synchronized to the rotor's position. Brushless DC motors thus have an electronically controlled commutation system, instead of a mechanical commutation system based on brushes. In a brushless DC motor, the electromagnets do not move, but rather the permanent magnets rotate and the armature remains static. This avoids the problem of having to transfer current to the moving armature. Brushless DC motors offer a number of advantages over DC motors featuring brushes, including higher efficiency and reliability, reduced noise, longer lifetime (no brush erosion), the elimination of ionizing sparks from the commutator, and overall reduction of electromagnetic interference (EMI).

One issue oftentimes taken into consideration when designing motors, more specifically brushless motors, is the power required to operate the motor. One technique to reduce power in some applications has been the introduction of Three Phase Brushless DC (TPDC) Motors. Another method makes use of six (6) drive transistors. Prior art literature describes many different techniques for both basic commutation and enhanced techniques designed to improve the acoustic signature of the fan under operation. The architectures for these solutions fall into two basic categories, Mixed-Signal Micro-Controller Unit (MCU), or analog Application Specific Integrated Circuit (ASIC). The simplest of all these is the low-side commutation scheme.

There are a number of Analog ASIC solutions using differential commutation schemes currently available. The range of complexity in the algorithm varies, with attempts to "soften" the startup current through various techniques, until the Back Electro-Motive Force (BEMF) signal can be detected. The Analog ASIC solutions tend to use external components to generate reference ramps and saw-tooth waveforms to be used as references against motor coil responses. While more compact, the analog solutions rely on external passive components to control the operational set points in the IC.

The Mixed-Signal MCU typically comprises an 8051-based micro-controller with various Analog-to-Digital Converter (ADC) modules, comparators, and in some cases filter modules. The MCU accurately controls timing, performs complex calculations and transformations, and enables communications directly with an external controller. High voltage solutions separate the electronics using either of these approaches and use external transistors and isolation.

In order to control the speed of the motor through a given command, either a voltage or PWM duty cycle, an error signal is developed. The theoretical method is to measure slope of the BEMF signal as the rotor passes the stator coil and use that information to determine the position of the rotor. A BEMF signal that is offset from its midpoint is typically indicative of the rotor deviating from the electrical commutation. If the BEMF signal is too high and early, it is an indication of the rotor spinning faster than the electrical commutation, and the next commutation period must be lengthened. Likewise, a BEMF signal that is too low and late would be indicative of the rotor spinning slower than the electrical commutation, requiring shortening the period. Developing this type of error signal in digital circuitry has required a microcontroller or microprocessor in the past, as well as a high speed Analog-to-Digital converter (ADC). One alternative method includes the development of analog circuitry to generate reference pulse trains, and the use of analog components to phase lock to the BEMF signal.

While these solutions have successfully provided some power savings, in many instances such power savings fell short of expectations. Since most, if not all of these solutions are designed for a specific motor type, they cannot easily be ported from application to application, or even from manufacturer to manufacturer. Each motor type requires tuning capacitors to adjust the commutation and startup frequencies, as well as crossover and dead-time locations in the commutation sequence.

One of the major disadvantages of prior art solutions has been the lack of power savings realized. All literature discusses power savings in the range of 15-30% over other solutions, with as much as 50% in the mid-range of the motor being driven. While some techniques operate to reduce the acoustic noise produced when switching the stationary electromagnets using PWM methods, additional power is yet required to drive the motor coils in this manner. The idea is to reduce the overall inductive spikes caused when the drive transistors are turned off. The literature contends switching the coils at a rate much, much higher than the commutation frequency will "soften" the switching and reduce the acoustic signature. Depending on the amount of time needed to "soften" both the rising and falling edges, as much as 30% of the overall time finds all three drive transistors conducting, increasing the current consumption by ⅓, since all 3 coils are conducting.

Another source of power inefficiency in some prior art solutions is the lack of "differential commutation". In other words, both the high-side and low-side transistors are switched off simultaneously, as a method to control the rotational speed. In a classic configuration, the high-side of the motor is connected directly to the power source.

Some implementations do not control the frequency or duty cycle of the PWM signals going to the drive transistors, but rather allow the incoming PWM to modulate the signals directly. The inability to limit either frequency or duty cycle means the motor is not being driven optimally for a given operating point, but is under the control of an external device that may or may not be aware of the motor limitations. This will cause the motor to use more current than required, producing additional heat that must be removed from the system.

Prior art solutions also fail to address the issue of over-current/lock rotor. The currents used are sufficient to damage the motor windings, and without a feedback method, a timer must expire before the damaging condition can be detected and corrected. If there is no provision for this event, the motor will continue to drive to destruction. Many solutions use a brute-force method to drive the motor coils during start-up, and may last several seconds, drawing several times the normal operating current. The period of time when this occurs is commonly referred to as the Forced Commutation phase of spin-up, and it is one of the drawbacks of the BEMF commutation method. Until the motor spins sufficiently fast enough to generate a BEMF signal, the motor is driven in an open loop configuration, at a predetermined frequency and PWM duty cycle, putting undue stress on the motor components.

Another issue present with respect to TPDC motors has been the presence of mechanical vibrations and altering the inherent acoustic signature of the fan impeller. TPDC motors may be driven with either sinusoidal or trapezoidal current waveforms. Classic drive schemes rely on creating zero current switching in order to minimize the effects of changes in instantaneous torque. These periodic changes in torque occur when the coils are energized and de-energized, or commutated, producing both mechanical vibration, and altering the inherent acoustic signature of the fan impeller. Both effects are undesirable in many applications, including fans for the PC industry.

Therefore, improvements in motor design and operation are desired.

SUMMARY OF THE INVENTION

Various embodiments are presented of a system and method for controlling a brushless three-phase DC motor. The motor may be an electronic motor, and may include a rotor having one or more permanent magnets. The one or more permanent magnets may be physically positioned in-board or out-board of the stationary section of the motor, referred to as the stator, which may include a plurality of electromagnets. The motor may include a voltage sensor configured to measure a voltage induced across one or more of the electromagnets. The voltage sensor may be part of the electromagnet. Each electromagnet may include such a voltage sensor, or alternatively, a voltage sensor may be usable to measure voltage for some or all of the electromagnets. Alternatively, the motor may comprise one or more Hall sensors or other equivalent sensors for measuring voltage.

The system may include logic for controlling the operation of the motor. The logic may be analog or digital, e.g., the logic may include one or more state machine based controllers or one or more application specific integrated circuits. The motor may instead (or in addition) include a processor, such as a microcontroller, and a computer accessible memory medium storing program instructions executable to control the motor. The processor may be configured to execute program instructions from the memory medium to control the motor.

The logic may be configured to iteratively perform certain steps. A pulse-width modulation (PWM) duty cycle may be calculated based on a minimum duty cycle and an input command. The input command may be scalable from the minimum duty cycle to a maximum duty cycle. The input command may be updatable at an adjustable interval, such as a number of iterations of the method, or an amount of time. The adjustable interval may be adjusted based on either 1) a number of intervals that have occurred since initiation (e.g. an initial iteration) of the method, or; 2) an amount of time that has occurred since initiation of the method; or 3) an estimated or calculated speed of the motor.

A voltage may be measured at a first expected zero crossing value. In one embodiment, the voltage induced by rotation of the rotor may be sampled at a first expected zero crossing value. The voltage may be induced across an undriven electromagnet of the plurality of electromagnets. Sampling this induced voltage may produce a first sampled voltage value. An average of a plurality of sampled voltage values may then be calculated. The plurality of sampled voltage values may include voltage values sampled at a plurality of prior expected zero crossing values and the first sampled voltage. The first sampled voltage value may then be subtracted from the calculated average to produce a delta zero crossing error.

The delta zero crossing error may be multiplied by a first constant to produce a representation of an angular velocity, where the first constant may represent electromechanical properties of the motor. The representation of the angular velocity may be divided by second constant, then be truncated, e.g. to an integer value. One or more time values may then be generated based on the representation of the angular velocity. The one or more time values may include a period, e.g., an amount of time until a next commutation of the plurality of electromagnets. The one or more time values may indicate a next expected zero crossing value. The next expected zero crossing value may be the same time value as the next commutation time of the plurality of electromagnets, or they may be different time values.

Operation of the motor may then be controlled based on the one or more time values and the PWM duty cycle. More specifically, the plurality of electromagnets on the stator may be driven by periodic bursts of current whose frequency and power may be specified by the PWM duty cycle in such a way as to drive the rotor at a particular rotational speed, while the one or more time values may determine the commutation timing of the electromagnets on the stator, such that the electromagnetic field of the stator may remain substantially in optimal alignment with the rotor, effecting an efficient transfer of power to the rotor at that particular rotational speed.

The above operations may repeat over a plurality of iterations. In one embodiment, the next zero crossing value from the previous iteration is used as the first expected zero crossing value in the next iteration.

The effects of commutation may be minimized using a sinusoidal current drive on each coil at the commutation point. This may be accomplished through the use of a drive transistor as a linear pass device to create a sinusoidal current drive, or through the use of a changing PWM duty cycle to create an effective sinusoidal current around each commutation point. Furthermore, the effects of coils switching may be minimized by delaying the "on" and "off" times of drive transistors in a full "H-bridge" drive scheme. In other words, the "on" and "off" times with respect to the commutation command may be overlapped to minimize the effects of coils switching. The overlapping times may be controlled using digital timers, making the response predictable and easily controlled.

In one set of embodiments, a motor may include a plurality of electromagnets configured around a rotor, with each electromagnet controlled through a respective drive transistor pair, with at least one respective drive transistor pair enabled at any point in time to energize its corresponding electromagnet. A present position of the rotor may be determined using un-energized electromagnets as magnetic sensors, and each respective drive transistor pair may be controlled according to the determined position of the rotor. The on-times and off-times of the respective drive transistor pairs may be overlapped with respect to a commutation command operative to switch from a first electromagnet that is energized to a second electromagnet that is not energized, to de-energize the first electromagnet and to energize the second electromagnet. In addition to overlapping the off-timing, the current waveform may be shaped to minimize the instantaneous rotational torque generated as the electromagnet turns off. The overlapping may be performed by delaying the on-times and off-times of the respective drive transistor pairs. Likewise by using the same timers and wave shape, the torque generated as the next electromagnet turns on may be minimized. By overlapping the "off" times with respect to the commutation command, it is possible to minimize the effects of coils turning off. Likewise by using the same timers and wave shape, the torque generated by turning on the next coil may be minimized.

In one set of embodiments, a motor that includes a plurality of electromagnets configured around a rotor may be controlled such that the effects of commutation are minimized. A respective drive signal may be provided to each electromagnet to energize at least one electromagnet at any point in time. A commutation command may be issued to switch from a first electromagnet that is energized to a second electromagnet that is not energized, to de-energize the first electromagnet and energize the second electromagnet, while overlapping the respective drive signals provided to the first electromagnet and the second electromagnet, to keep the first electromagnet at least partially energized until the second electromagnet is at least partially energized. The waveforms of the currents developed in the respective coils of the first electromagnet and the second electromagnet may also be shaped while overlapping the respective drive signals, to minimize the instantaneous rotational torque generated as the first electromagnet turns off. At least one electromagnet may be kept un-energized for at least a portion of the time period when the remaining electromagnets are energized, to measure a present position of the rotor. The commutation command may be issued based on the determined present position of the rotor. The respective drive signals may be generated by controlling a respective drive transistor pair for each electromagnet, delaying the off-time of the respective pair of transistors for the first electromagnet, or delaying the on-time of the respective pair of transistors for the second electromagnet to overlap the respective drive signals provided to the first electromagnet and the second electromagnet. The control signals provided to the drive transistors may be PWM signals, and the duty-cycle of the respective PWM signals may be adjusted while delaying the off-time or on-time, to ensure that no discontinuous current exists in the coils, while only one transistor is turned on at a time. The duration of the overlap may be controlled using digital timers to obtain a predictable response.

Figure 1A:
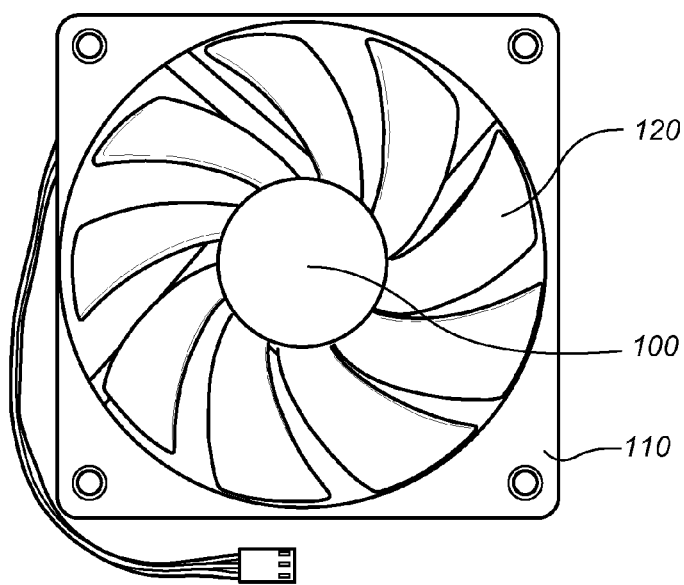
FIGS. 1A and 1B illustrate different views of an exemplary fan and fan motor.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS OF THE INVENTION

Figure 1B:
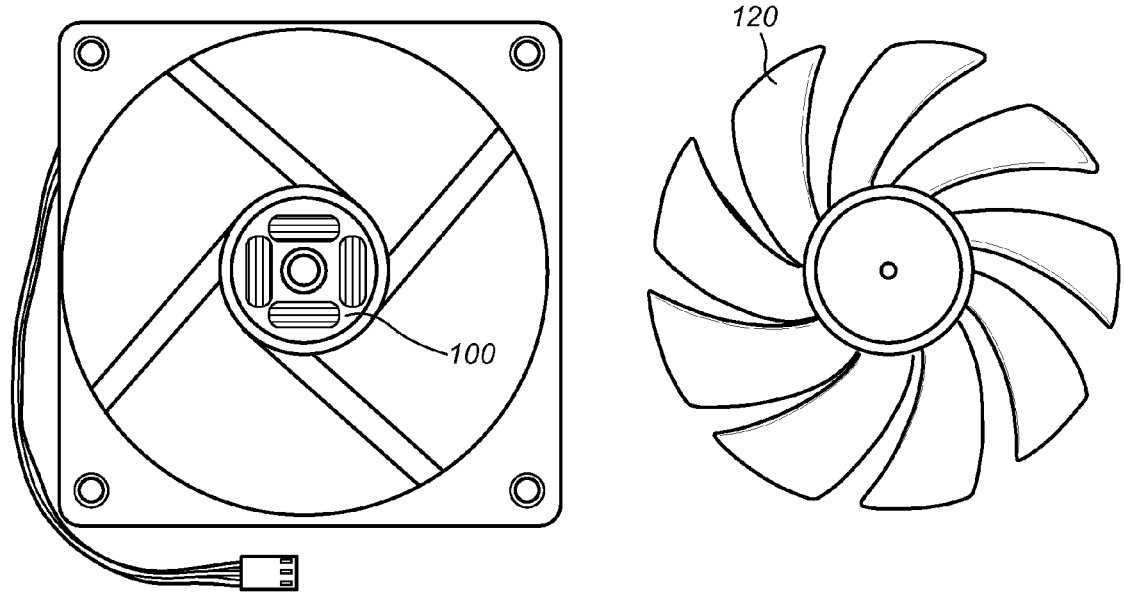

FIGS. 1A and 1B—Exemplary Fan and Fan Motor

FIGS. 1A and 1B illustrate an exemplary fan assembly 110 according to one embodiment. Fan 110 may be a cooling fan, for example a fan for use in a laptop or a desktop computer. Fan 110 may alternatively be a commercial or industrial fan, or in general any type of fan driven by a motor. Fan assembly 110 may include a motor assembly 100 as well as fan blades 120. Motor assembly 100 may comprise a motor (e.g. motor 102 shown in FIG. 5) as well as drive circuitry (for example, drive control logic 502 shown in FIG. 5) for controlling motor 102.

Although FIGS. 1A and 1B illustrate a fan as the load being driven by the motor, it should be noted that the system and method for controlling a motor as described herein may be suited for driving any of various types of loads, including without limitation hard disk drives, drive motors for appliances, propellers, wheels, pumps, or other loads.

Figure 2:
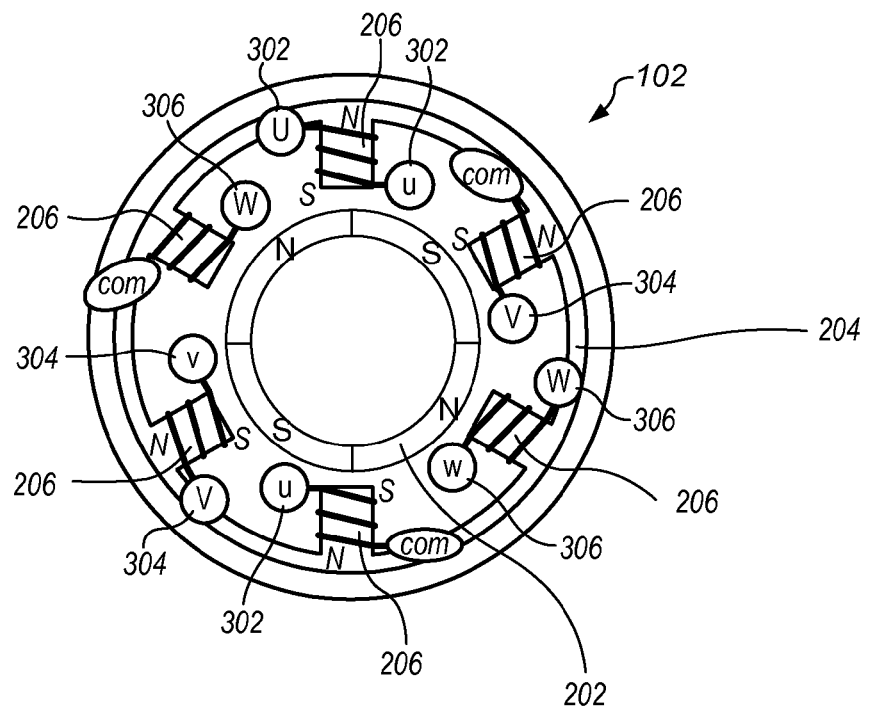
FIG. 2 illustrates a simplified diagram of one embodiment of a brushless four-pole three-phase electric motor.

FIG. 2—Brushless Four-Pole Three-Phase Motor

FIG. 2 illustrates a simplified diagram of an exemplary brushless four-pole three-phase motor 102. Motor 102 may be electrically powered, e.g., by direct current (DC) electricity. Motor 102 may also be electronically controlled, and may include a rotor 202, which may include one or more permanent magnets Rotor 202 may have four poles as shown, with alternating North "N" and South "S" poles. Alternatively, rotor 202 may include two, six or any other number of poles as desired. Motor 102 may include a stator 204 including a plurality of electromagnets 206, positioned around rotor 202. There may be six electromagnets 206, which may be arranged such that they are equally spaced with respect to each other around stator 204. Electromagnets 206 may be arranged as three pairs of electromagnets 206, such that each pair of electromagnets may be powered in a different phase than the other (remaining) pairs of electromagnets. The three pairs of electromagnets 206 may be connected in a "Y" configuration, making motor 102 a three-phase motor. Motor 102 may be brushless, e.g., it may not include any brushes relaying current to rotor 202. Additionally, motor 102 may be sensor-less, e.g. it may not include a discrete rotor position sensing mechanism such as one or more Hall sensors (e.g. the Hall sensors shown in FIG. 4). In another embodiment, motor 102 may include Hall sensors. Two of the three pairs of electromagnets 206 on stator 204 may be driven to induce or maintain rotation of rotor 202 at any given time. Motor 102 may then utilize one of the undriven electromagnets of stator 204 to indirectly detect the position of rotor 202 (or it may use Hall sensors for detection). The phases of stator 204 may be driven in a pattern ideally configured to induce rotation of rotor 202. The polarity of electromagnets 206 may be periodically commutated as part of this pattern.

Figure 3:
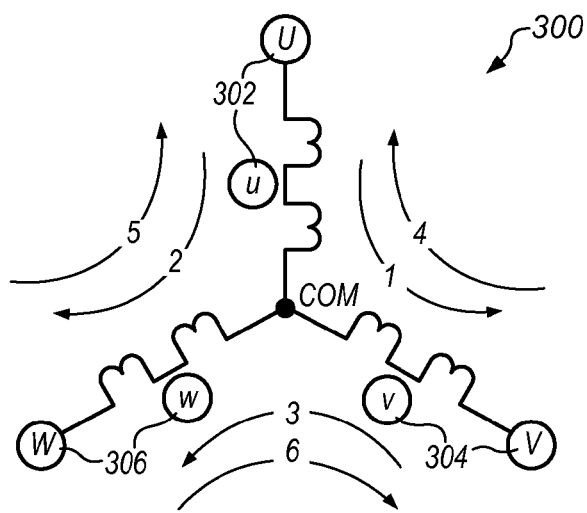
FIG. 3 illustrates the commutation pattern of a brushless three-phase electric motor according to one embodiment.

FIG. 3—Commutation Pattern of a Brushless Three-Phase Motor

FIG. 3 illustrates a simplified circuit diagram depicting a commutation pattern of a brushless three-phase motor according to one embodiment. Motor 102 may be a brushless, three-phase DC motor as described above. Electromagnets 206 may be connected in a "Y" configuration as shown. Motor 102 may also be a sensor-less motor as also described above, e.g. it may utilize an undriven stator electromagnet to indirectly detect the position of the rotor. In alternate embodiments, motor 102 may include Hall sensors to detect the position of rotor 202. Motor 102 may determine the timing of each commutation of the commutation pattern according to one embodiment of a method described herein. To control rotation of rotor 202, two pairs of the electromagnets on stator 204 may be driven at any one time. A given pair may be driven on the 'high-side' or the 'low-side', indicating in which direction current is being conducted in the windings of the driven pair of electromagnets. Depending on the number of poles in rotor 202, the electromagnets of a given pair of electromagnets may be wound in the same direction or in opposite directions. For example, with a four-pole rotor (as shown in FIG. 2), the windings may be configured such that the opposite sides of an electromagnet pair may present the same polarity (e.g., 'S') to the rotor, while with a two pole rotor, the windings may be configured such that the opposite sides may present opposing polarity (e.g., one 'S', one 'N'). Thus in some cases the convention used to define the polarities indicated by 'high-side' and 'low-side' may depend on the magnetic configuration of rotor 202. Other naming and/or driving conventions are also possible and are contemplated.

A commutation cycle may include six phases. The phases may correspond to the numbered arrows ('1' through '6') shown in FIG. 3. In FIG. 3, each arrow points from the high-side driven pair to the low-side driven pair. Thus for example, arrow '1' may indicate that in the first phase of the commutation cycle, 'U' electromagnet pair 302 may be driven on the high-side, while 'V' electromagnet pair 304 may be driven on the low-side, with 'W' electromagnet pair 306 remaining undriven. Arrow '2' may then indicate that in the second phase of the commutation cycle, F electromagnet pair 306 may again be driven on the high-side, while 'W' electromagnet pair 304 may be driven on the low-side, with 'V' electromagnet pair 302 remaining undriven. Each of the remaining numbered phases (illustrated by arrows '3' through '6') would operate in a similar manner to create a full commutation cycle, which may be repeated to increase, maintain, or otherwise affect rotation of rotor 202.

If motor 102 is a DC powered motor, rotational speed may be controlled by means of pulse width modulation (PWM) of the electromagnets. Generally speaking, a PWM duty cycle may indicate how fast rotor 202 should rotate. More specifically, the PWM duty cycle may specify how often and with how much power to drive electromagnets 206 of stator 202.

As noted above, one pair of electromagnets may remain undriven during each phase of the commutation cycle. If rotor 202 is rotating, the movement of the one or more permanent magnets in rotor 202 past the undriven electromagnet may cause an induced voltage in the undriven electromagnet. Thus, during each phase of the commutation cycle, whichever pair of electromagnets is undriven may be used to sample the voltage induced by the rotation of the permanent magnet(s) in rotor 202 in one or both of those electromagnets. This is also known as Back Electro-Motive Force (BEMF) sampling. The sampled voltage may be used to help determine the present position and/or rotational velocity of rotor 202. The sampled voltage or information inferred from the sampled voltage may be used to control future commutation timing and/or other aspects of motor control according to various embodiments. As noted above, embodiments in which motor 102 includes Hall elements (i.e. Hall effect sensors) to detect the absolute position of the rotor, BEMF sampling may not be required, and therefore may not be used.

Figure 4:
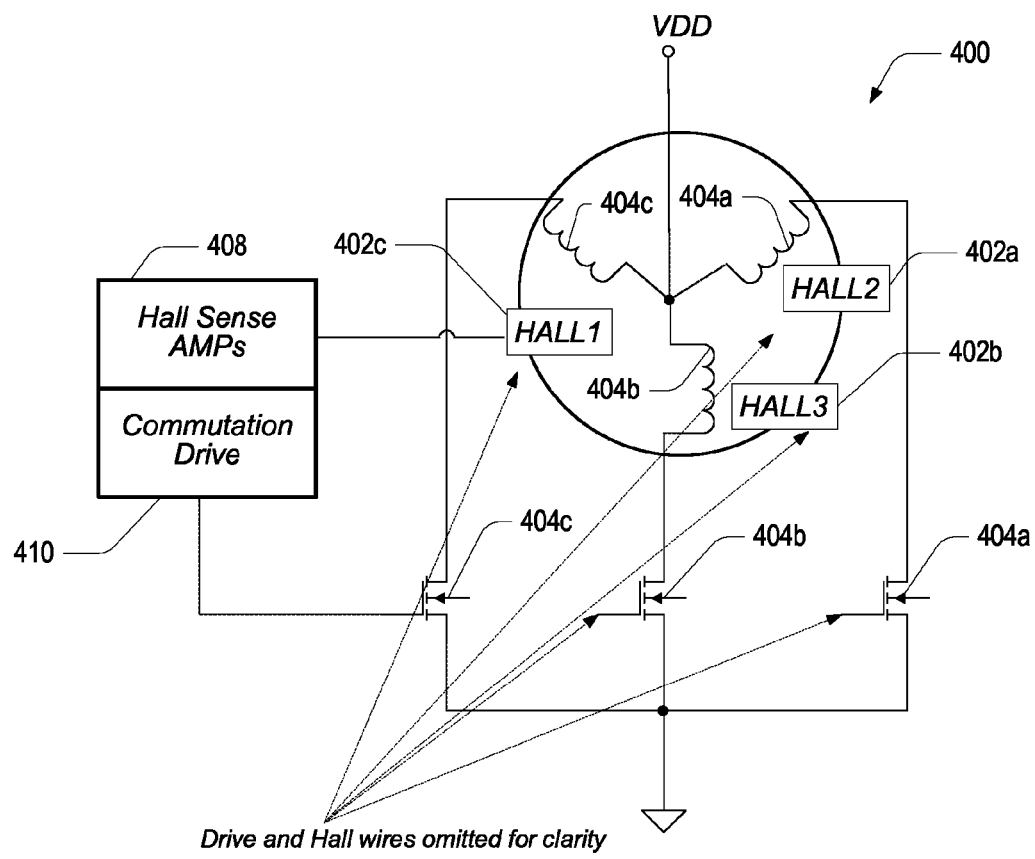
FIG. 4 is a circuit diagram of one embodiment of a motor with Hall Sensors and Hall Sense amplifiers.

FIG. 4—Circuit Diagram of a Motor with Hall Sensors and Hall Sense Amplifiers

As mentioned above, some motors may include Hall elements (or sensors) to detect the position of rotor 202. FIG. 4 illustrates a simplified circuit diagram depicting brushless DC motor 400 that includes Hall effect sensors 402a-402c. One advantage of brushless motors in general is the reduction in the power required to operate the motor. FIG. 4 is illustrative of one embodiment of a typical three-phase brushless DC (TPDC) motor. The drive electronics for motor 400 rely on Hall elements (Hall effect sensors) 402a-402c to detect the absolute position of the rotor at all times, and switch drive transistors (404a-404c) to maintain motor rotation. A Hall effect sensor may be a transducer that varies its output voltage in response to changes in magnetic field. Motor 400 may be electrically connected in a "Y" configuration as shown (and as also previously mentioned), so named due to the configuration's resemblance to the letter "Y". A common point for the three coils 404a-404c may be connected to the electrical source VDD, and drive electronics 410 may be operated to switch drive transistors 404a-404c to maintain the rotating electro-magnetic field required to turn motor 400.

Figure 5:
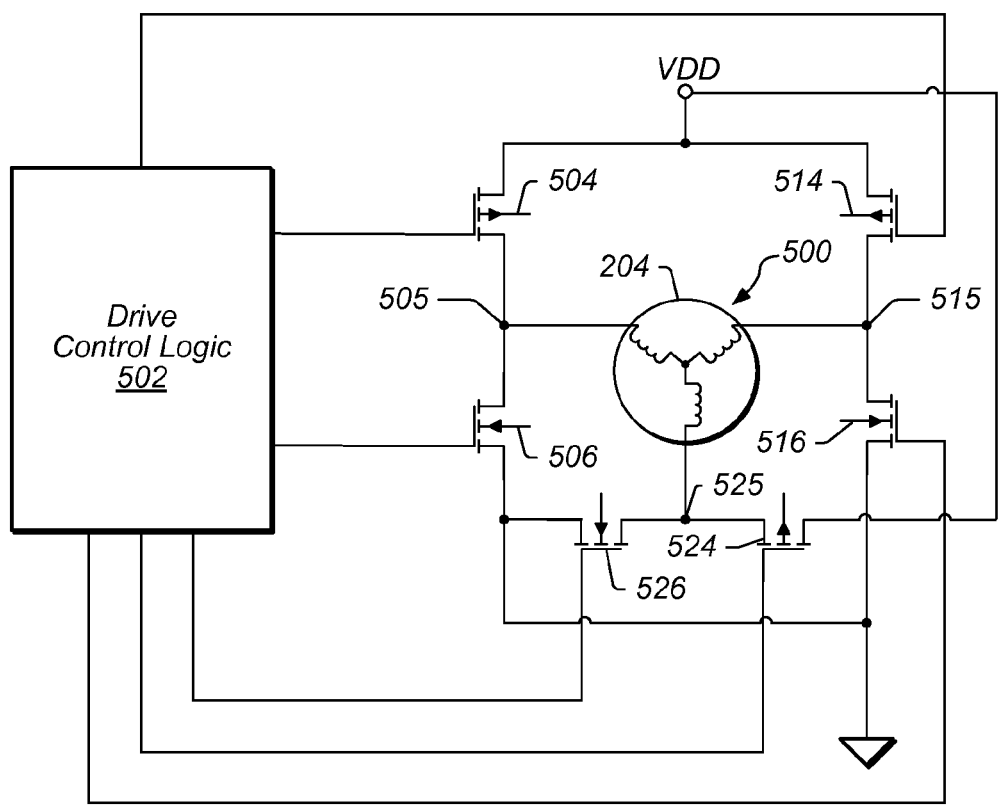
FIG. 5 is a circuit diagram of one embodiment of a motor with drive control logic.

FIG. 5—Circuit Diagram of a Motor with Drive Control Logic

FIG. 5 illustrates a simplified circuit diagram of a motor 500 (which may be similar to motor 102 shown in FIG. 2), and its drive control logic 502. In contrast to motor 400 shown in FIG. 4, motor 500 may use six drive transistors, as shown in FIG. 5. In this configuration, one high-side pair of electromagnets and one low-side pair of electromagnets may be on at any point in time, completing the electrical circuit through two of the three legs (of the Y configuration) of the motor. As previously mentioned, in this case the un-energized coil may be used as a magnetic sensor to determine the rotor position, referred to as BEMF detection. The motor system shown in FIG. 5 therefore has the added benefit of eliminating the relatively expensive Hall elements and associated electronics (shown in FIG. 4).

Overall, motor 500 may be a sensor-less, brushless, three-phase motor as described above and illustrated in the various Figures. As shown, motor 500 may include a stator 204, which may include three pairs of electromagnets. Each pair of electromagnets may have a corresponding pair of transistors, e.g., field effect transistors (FETs). The transistors may be configured such that each pair of electromagnets is effectively bipolar, e.g., the polarity may be reversible. In other words, for each electromagnet pair, one transistor may drive the pair on the high-side, or the other transistor may drive the pair on the low-side. For example, FET 504 may be the high-side transistor for the 'U' pair 302, while FET 506 may be the low-side transistor for the 'U' pair of electromagnets 302. Similarly, FETs 514 and 516 may be the respective high-side and low-side transistors for the 'V' pair of electromagnets 304, while FETs 524 and 526 may be the respective high-side and low-side transistors for the 'W' pair of electromagnets 306. In addition to the particular embodiment shown, any number of other wiring configurations (e.g. using a different number or types of transistors) is also be possible and is contemplated.

The transistors for each pair of electromagnets may be controlled by drive control logic 502. Drive control logic 502 may be electronic logic configured to perform various operations as described herein, such as sampling voltages induced across the electromagnets, performing calculations (e.g. simple integer math or more complex operations) to determine values used for controlling the electromagnets, and/or sending control and/or power signals to the electromagnets. Drive control logic 502 may also receive signals from one or more outside control devices, such as a fan speed control device. For example, a fan speed control device might periodically send an input command indicating a desired change in motor velocity based on some outside condition, such as an ambient temperature, which drive control logic 502 might incorporate into its control calculations. Other outside control devices are also envisioned. Alternatively, such control devices may be incorporated into drive control logic 502 itself.

In addition to any steady state or natural commutation control logic functions described herein, drive control logic 502 may have logic for controlling the motor under other conditions; for example, drive control logic 502 may include logic for a DC excitation operation to align the rotor to a known position prior to beginning rotation; logic for a forced commutation operation to begin rotation of the rotor; logic for stopping rotation of the rotor; logic for determining if a stall condition exists; and/or logic for other functions, as well as logic for switching from one function to another at an appropriate time.

Drive control logic 502 may be any of various types of logic, e.g., analog or digital, or a combination thereof. For example, drive control logic 502 may be implemented as a processor, e.g. a microcontroller, executing instructions comprised on a memory medium; a state-machine based digital controller; a Field Programmable Gate Array (FPGA) and/or a mixed signal application specific integrated circuit (ASIC). Alternatively, drive control logic 502 may include any combination of the above. Drive control logic 502 may thus be implemented using any of various digital or analog techniques, or a combination thereof, as would be apparent to one of ordinary skill in the art.

As previously mentioned, motor 500 may be a brushless, three-phase motor as described above and illustrated in the various Figures. Motor 500 may thus be structured and may operate as motor 102 described in FIG. 2. A steady state operation of motor 500 may be referred to as the natural commutation operation of the motor. Steady state or natural commutation may refer to operation of a motor once the rotor is already spinning In other words, natural commutation may refer to maintaining or adjusting the rotation speed of the rotor once it is already in motion. In some embodiments a motor may use a different method (e.g. different control logic) for initiating rotation of a stationary rotor than it may use for maintaining or adjusting the rotation speed of an already rotating rotor.

Three-phase brushless motors, such as motor 500, may be driven with either sinusoidal or trapezoidal current waveforms. Classic drive schemes may rely on creating zero current switching in order to minimize the effects of changes in instantaneous torque. These periodic changes in torque occur when the coils are energized and de-energized, or commutated, producing mechanical vibrations and altering the inherent acoustic signature of the fan impeller. Both effects may be undesirable in many applications, including fans for the PC industry.

The effects of commutation on motor 500 may be minimized using a sinusoidal current drive on each coil. This may be accomplished in one of two ways, using a drive transistor as a linear pass device to create a sinusoidal current drive or to use a changing PWM duty cycle to create an effective sinusoidal current around each commutation point. However, each of these methods has some limitations. If a transistor is being used as a pass element to generate a sinusoidal current in the coil, any voltage in excess of the voltage needed for sinusoidal waveform generation may constitute energy that is lost through dissipation.

Figure 6:
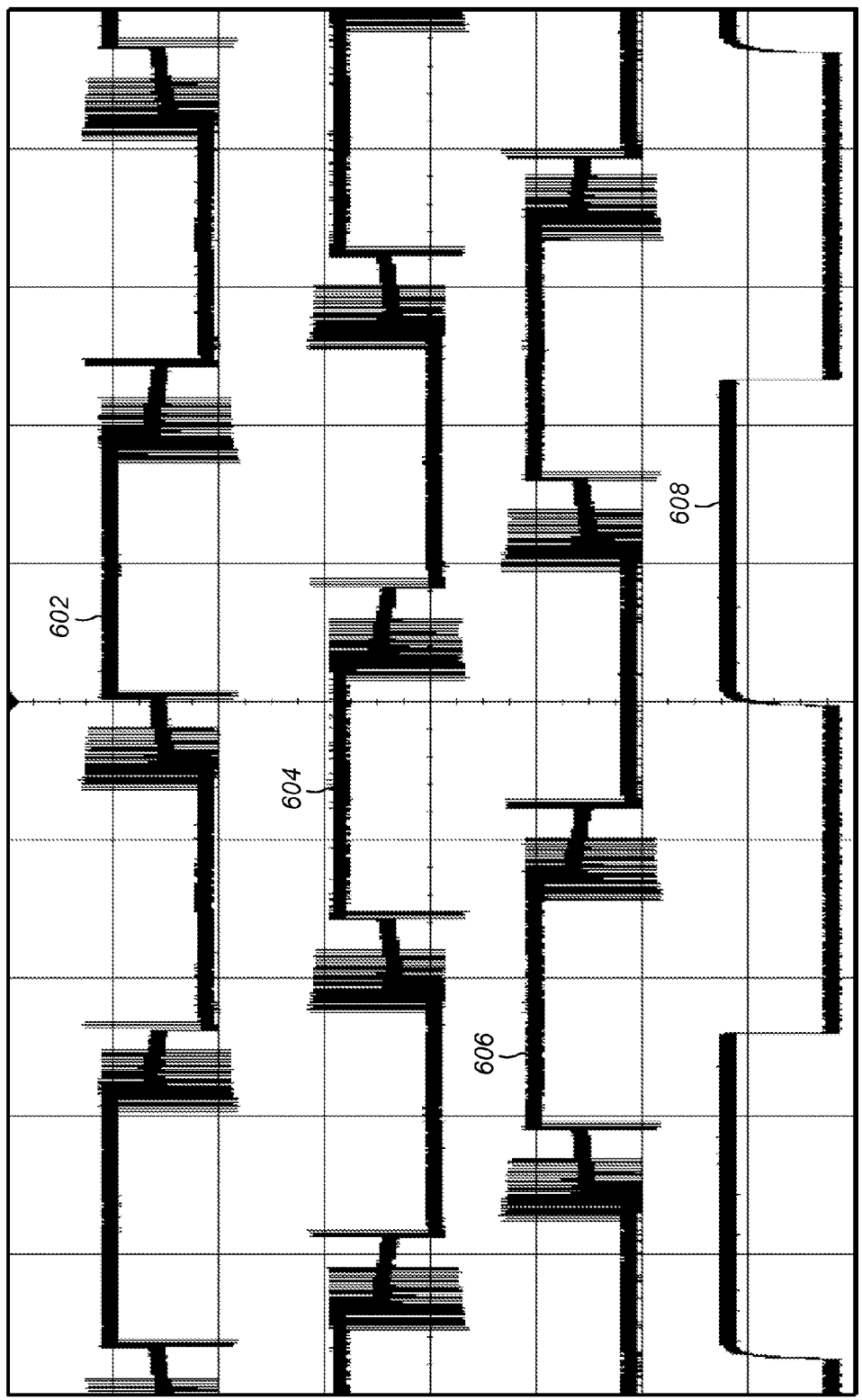
FIG. 6 is a diagram showing PWM motor control signals generated to ensure vibration and acoustic signatures are within acceptable levels, according to one embodiment.

Use of a changing PWM duty cycle to create an effective sinusoidal current around each commutation point may not suffer from the losses of a linear pass element, but it may consume additional current, as there will be a minimum time when the current through any coil is zero. This may increase current consumption at any point where all three coils are driven. As an example, FIG. 6 shows the PWM duty cycle implementation used by the Sanyo Semiconductor LV8800 to ensure the vibration and acoustic signatures are at an acceptable level. Waveforms 602, 604, and 606 represent the PWM control signals for the three pairs of electromagnets, respectively, with respect to commutation command signal 608. As shown in FIG. 6, the duty cycles for each PWM signal may vary from a very large duty cycle to a very short duty cycle to generate a sinusoidal switching current. During this period of time, the current used to generate the sinusoidal switch increases power consumption without increasing the RPM (revolutions per minute), resulting in a loss in efficiency.

In one set of embodiments, in order to minimize the effects of the coils switching, the "on" times and/or "off" times of drive transistors in a full "H-bridge" drive scheme, such as the one shown in FIG. 5, may be delayed. That is, the respective "on" times and/or "off" times of transistor pairs 504 and 506, 514 and 516, and 524 and 526 may be delayed such that the respective drive signals provided to the electromagnets (and coils) between which the commutation occurs overlap. By overlapping the "on" times with respect to the commutation command or the "off" times with respect to the commutation command, it may be possible to minimize the effects of coils turning off. In addition to overlapping the off-timing (or on-timing), the waveform of the current conducted in the coils of the electromagnets may be shaped to minimize the instantaneous rotational torque generated as the coil turns off. The overlap times may be controlled by digital timers, making the response predictable and easily controlled.

Figure 7:
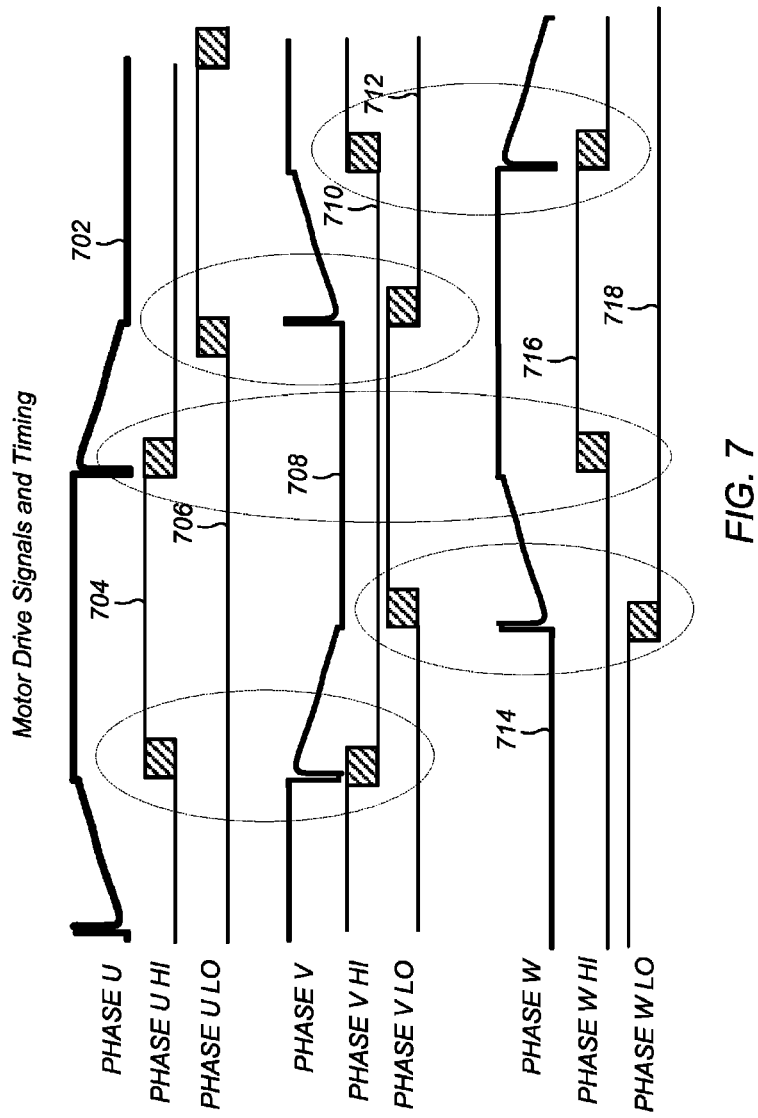
FIG. 7 is a diagram showing the relationships between the timer signals and the delays on the drive signals according to one embodiment.

FIG. 7 depicts the relationships between the timers, and the delays on the drive signals for the motor system of FIG. 5 (U, V, and W refer to the three coils as detailed in FIG. 3—it should be noted that the coils in the motor system disclosed in FIG. 5 may be implemented as the coils U, V, W shown in FIG. 3). As shown in the diagram of FIG. 7, waveform 702 represents the drive signal for the phase U coil with respect to the respective high-side (704) and low-side (706) control signals for the transistors associated with the phase U coil, waveform 708 represents the drive signal for the phase V coil with respect to the respective high-side (710) and low-side (712) control signals for the transistors associated with phase V coil, and waveform 714 represents the drive signal for the phase W coil with respect to the respective high-side (716) and low-side (718) control signals for the transistors associated with the phase W coil. As also shown in FIG. 7, the "on-" and/or "off-" times of the respective high-side and low-side control signals may be delayed, represented by the shaded areas in waveforms 704, 706, 710, 712, 716, and 718, to effect slight overlaps between drive signals 702, 708, and 714. In one set of embodiments, the delays of the off-times and/or on-times may be set in terms of number of clock cycles, and may vary within a specified range. Furthermore, the delayed on-times and off-times are highlighted in FIG. 7 by the dashed lines, pointing out where on-times and/or off-times may be delayed to overlap with each other, for example the on-time of Phase U Hi overlapping the off-time of Phase V Hi, the on-time of Phase U Lo overlapping the off-time of Phase V Lo, etc.

Figure 8:
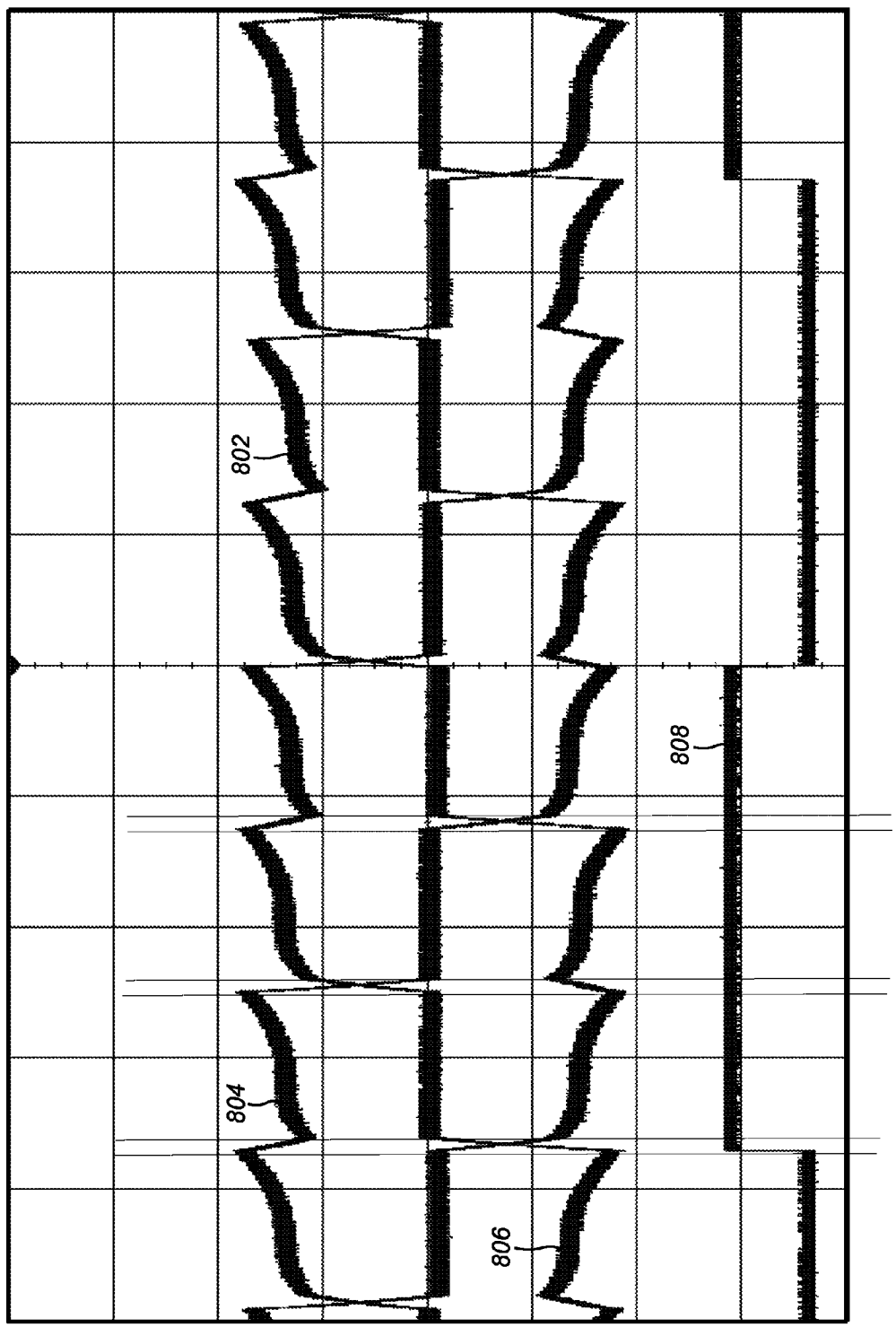
FIG. 8 is a diagram showing current measurements for coils U, V, and W, according to one embodiment.
Figure 9:
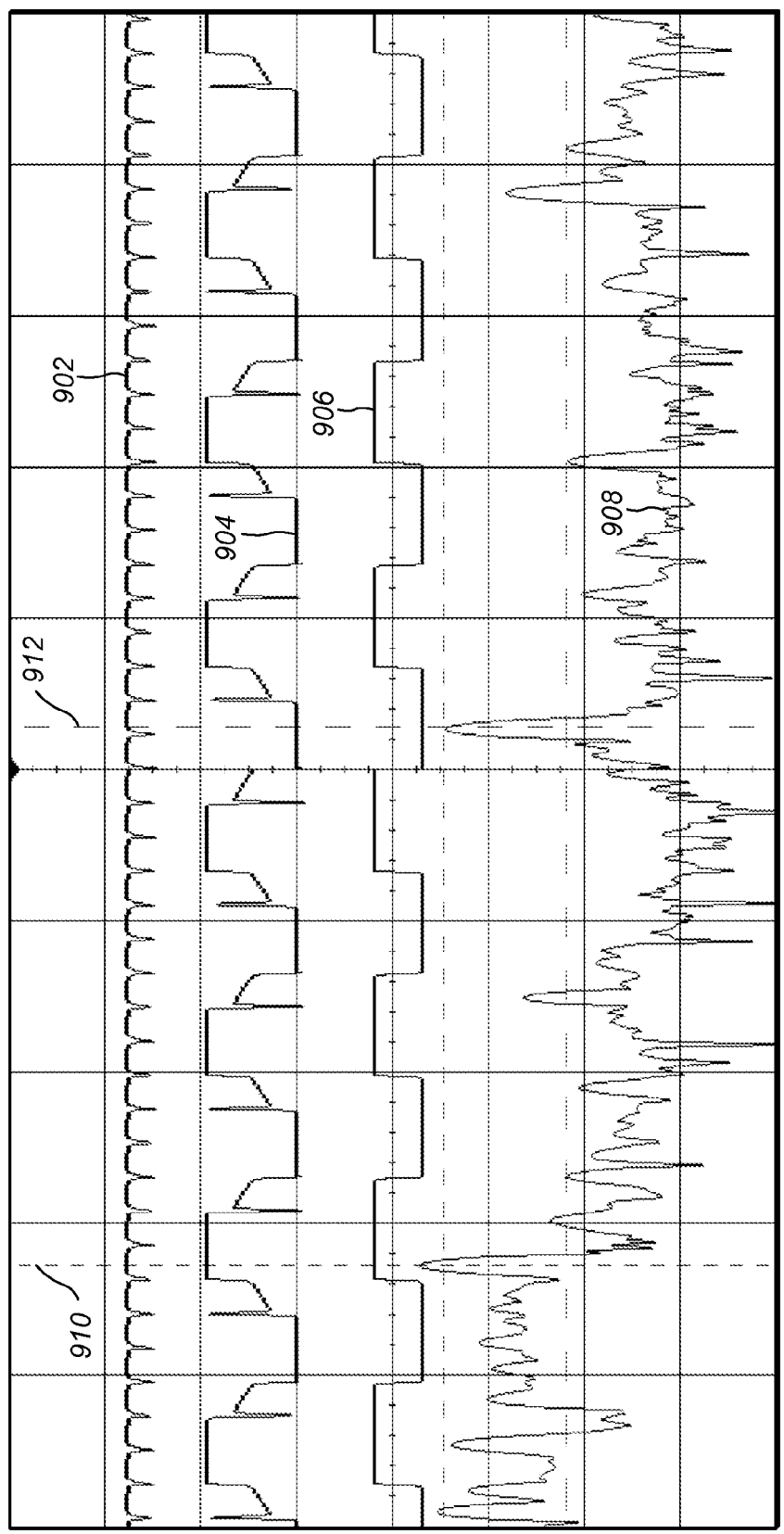
FIG. 9 is a diagram showing the overall current measured at the power supply, according to one embodiment.

A basic drive scheme of the motor circuit of FIG. 5 is shown in FIG. 8 by way of representing current measurements in coils U, V, and W, according to one embodiment. As shown in FIG. 8, traces 802, 804, and 806 represent the respective currents developed in coils U, V, and W (as detailed in FIG. 3—see also above) for commutation signal/command 808. The overall current measured at the power supply for the scheme illustrated in FIG. 8 is shown in FIG. 9. In FIG. 9, trace 902 represents the current, and the Fast Fourier transform (FFT) of the vibration sensor is represented by trace 908. Trace 904 represents the drive signal as seen at the terminal of one of the electromagnets (coils), and trace 906 represents a tachometer signal output from the drive control logic. Cursors (indicated by vertical dashed lines 910 and 912) have been placed on the offending vibration peak. The waveforms shown in FIG. 9 represent waveforms that may be obtained through a sensor processed using a high-end oscilloscope.

Figure 12:
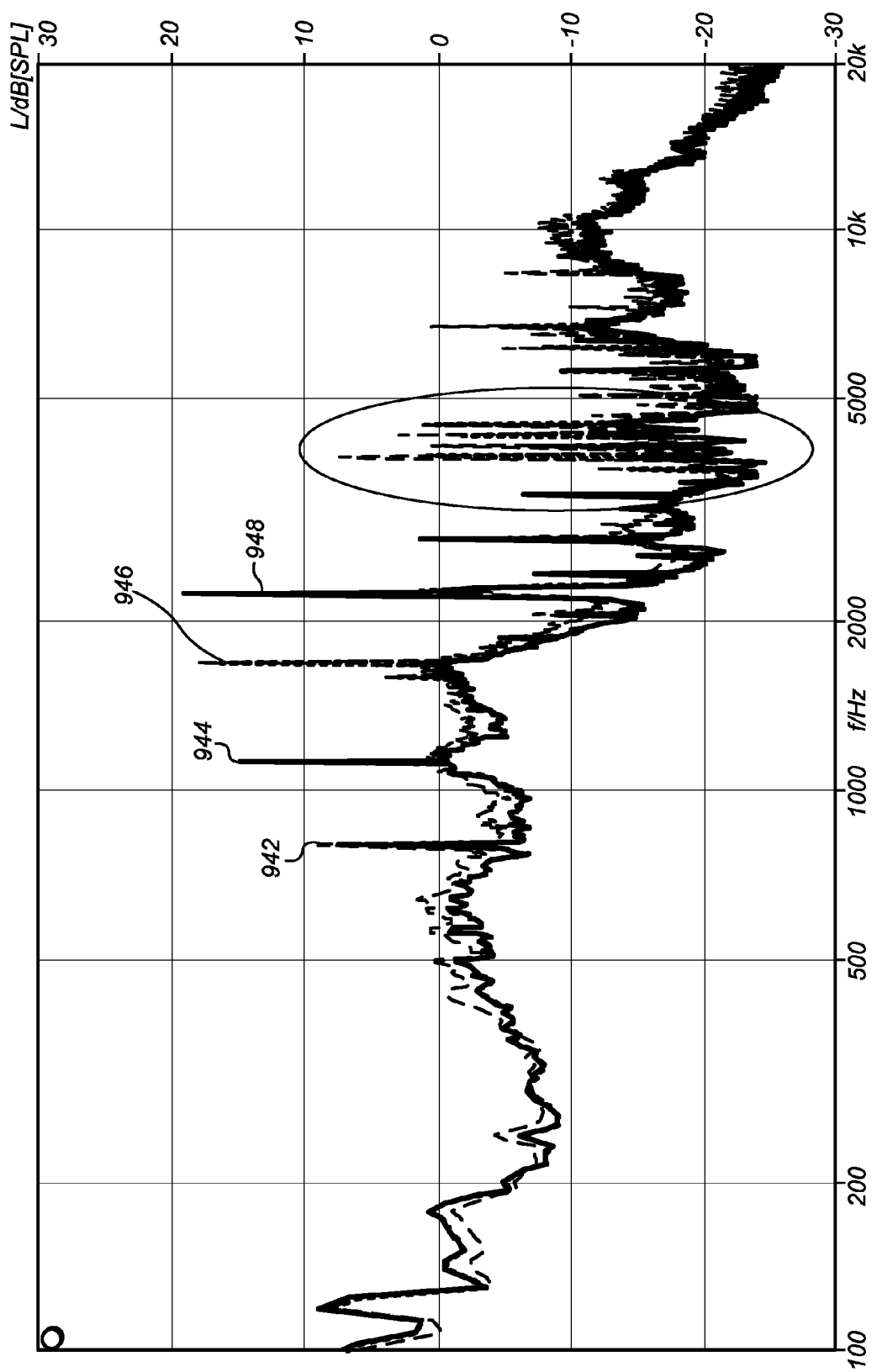
FIG. 12 shows the Fast Fourier Transform of a vibration sensor obtained using real acoustic performance evaluation software, according to one embodiment.

Typically, when the fan spins at a given RPM, the commutation frequency may be fixed, which may result in the generation of acoustic tones if there are sharp edges on the coil currents. The edges may occur at either multiples of the commutation (12 commutations per revolution—or per rotation), or at each blade pass, which may be a multiple of the actual number of blades in the fan. Therefore, the frequency of the acoustics may change with the RPM. To further illustrate the effects of commutation with respect to the fan acoustics, FIG. 12 shows the FFT of a vibration sensor (in effect the waveform commensurate with, or equivalent to trace 908 in FIG. 9) that may be obtained using real acoustic performance evaluation software. The harmonics highlighted in FIG. 12 represent multiple frequencies of the rotation (the frequency at which the motor is rotating, or RPM as discussed above). In the waveform shown in FIG. 12, 12× (circled), and multiples of 12 (peak 944 corresponding to 24×, peak 946 corresponding to 36×, and peak 948 corresponding to 48×) are the result of commutation, when 12 commutations are performed to obtain a single mechanical rotation, while the multiples of 17× (e.g. represented by peak 942) are "blade pass" frequencies generated by the blades when they strike the air. The example waveform shown is for a fan having 17 blades.

Figure 10:
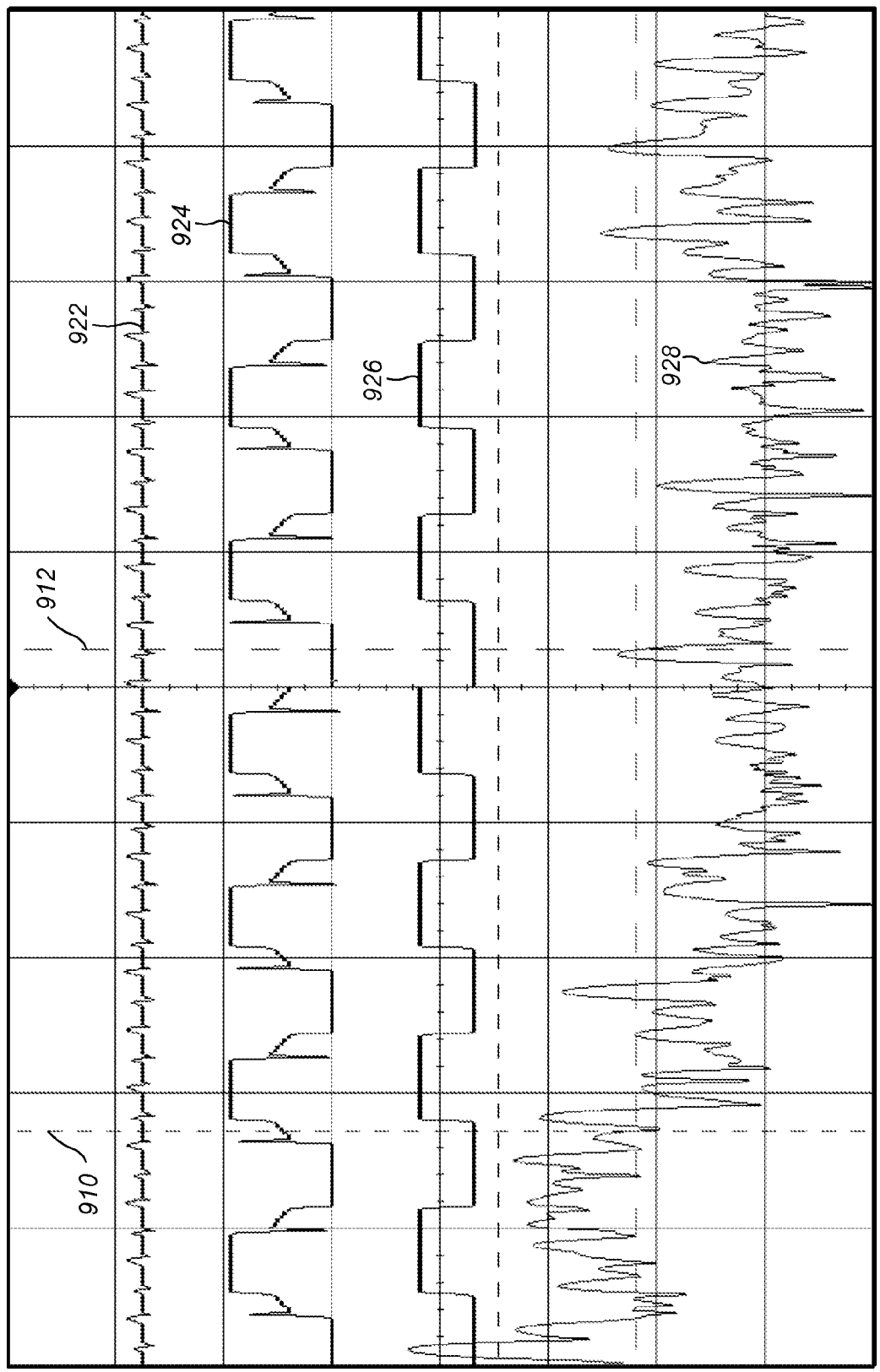
FIG. 10 is a diagram showing the overall current measured at the power supply, with improvements in the vibration signature.

The efficacy of overlapping the control signals of the electromagnets as described above (but without employing the wave shaping that was also described above) in reducing vibration is illustrated in FIG. 10. As shown in FIG. 10, the spikes tending toward zero on current trace 902 in FIG. 9 have been minimized on current trace 922, and the vibration spike appearing on trace 908 has been reduced by 25 dBV as seen on corresponding trace 928. Here again, trace 924 represents the drive signal as seen at the terminal of one of the electromagnets (coils), and trace 926 represents a tachometer signal output from the drive control logic. As seen in FIGS. 9 and 10, one important difference between the results shown in FIG. 9, and the results shown in FIG. 10 is the improvement in vibration signature without sacrificing overall efficiency. Analysis of performance improvements shows no degradation in the RPM vs. current curves and the maximum attainable RPM has increased approximately 5%, meaning less current may be required to attain a given RPM when compared against the baseline. Regarding the use of trapezoidal current waveforms versus the classic sinusoidal waveforms, presently no successful implementations using trapezoidal drives exist in the industry, as the vibration and/or acoustic signatures are typically unacceptable.

Referring again to FIG. 8, the current signals 802, 804 and 806 (in the respective electromagnet coils U, V, and W), as they appear, are indicative of a trapezoidal current. As seen in FIG. 8, each of the three currents (802, 804, 806), remains high for two commutations, off for one commutation, low for two commutations, and again off for one commutation. This cycle is then repeated. The areas of discontinuity in the current appear as instant changes in direction, some of which are indicated by the dashed lines on both sides of steep slopes representing a clear change in the direction of the current flowing in the coil. Every time such an abrupt change in the direction of the current occurs, it generates a change in torque, which in turn generates a mechanical impulse that may travel through the fan housing and blades, resulting in acoustic noise.

While a simple delay on the off-times (or on-times) may be used to eliminate the offending mechanical vibration frequency, overlapping the control signals alone may not truly eliminate the rotational torque, instead shifting and spreading the vibration spectrum, raising the noise floor, and possibly hiding higher frequency tomes that may have been generated. Some of these effects are illustrated in FIG. 12, which was previously described (including the acoustic harmonics that may be present). In one set of embodiments, a wave-shaping algorithm may be used to obtain a continuous current waveform with minimized discontinuities, which may provide an effective method to minimize the acoustic and vibration signature of the fan. The individual phase currents may be measured to determine how well the currents are responding. By using the basic commutation structure shown in FIG. 5, and modifying the PWM duty cycle during the control signal overlap as represented by the shaded areas in FIG. 7, it may be possible to shape the current waveforms to obtain a desired torque response. In one set of embodiments a set of wave-shaping coefficients may be obtained, the different coefficients respectively corresponding to the type of wave-shaping employed, and may be based on the application and on acoustic and vibration requirements. Subsequently, by simply tuning the wave-shape coefficients, many different types of responses may be generated.

Figure 13:
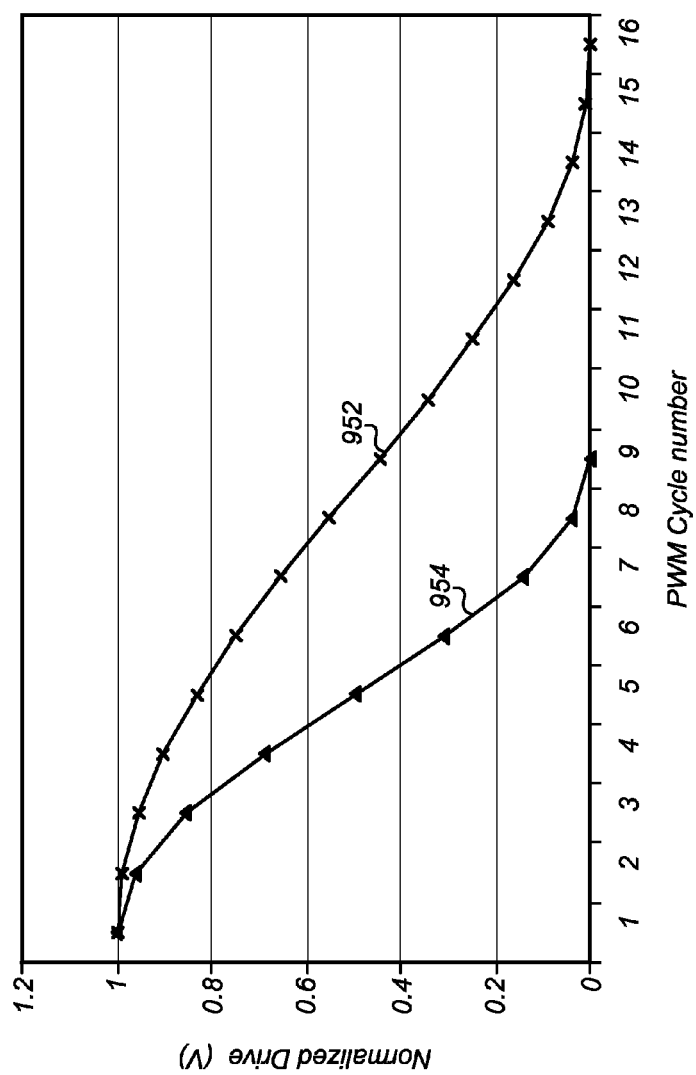
FIG. 13 shows a weighted cosine coefficient plot relating the desired PWM duty-cycle value to normalized drive voltage, according to one embodiment.

FIG. 13 shows a weighted cosine coefficient plot relating the desired PWM duty-cycle value to normalized drive voltage. Curve 954 corresponds to an 8-point weighted cosine function and curve 952 corresponds to a 12-point weighted cosine function. The curves in FIG. 13 indicate a flat frequency, except for the fundamental frequencies generated as a result of the electrical commutation, and the "Blade Pass Tone" generated by a specified number of blades in the rotor traveling at a fixed RPM. Since those fundamental frequencies may still be present, a set of subtraction values may be used in addition to obtain the final desired PWM values, to account for the delay times of the transistors in order to completely smooth the current. In other words, the cosine function shown in FIG. 13 may be delayed, and the desired PWM values obtained based on the delayed cosine function(s).

Figure 11:
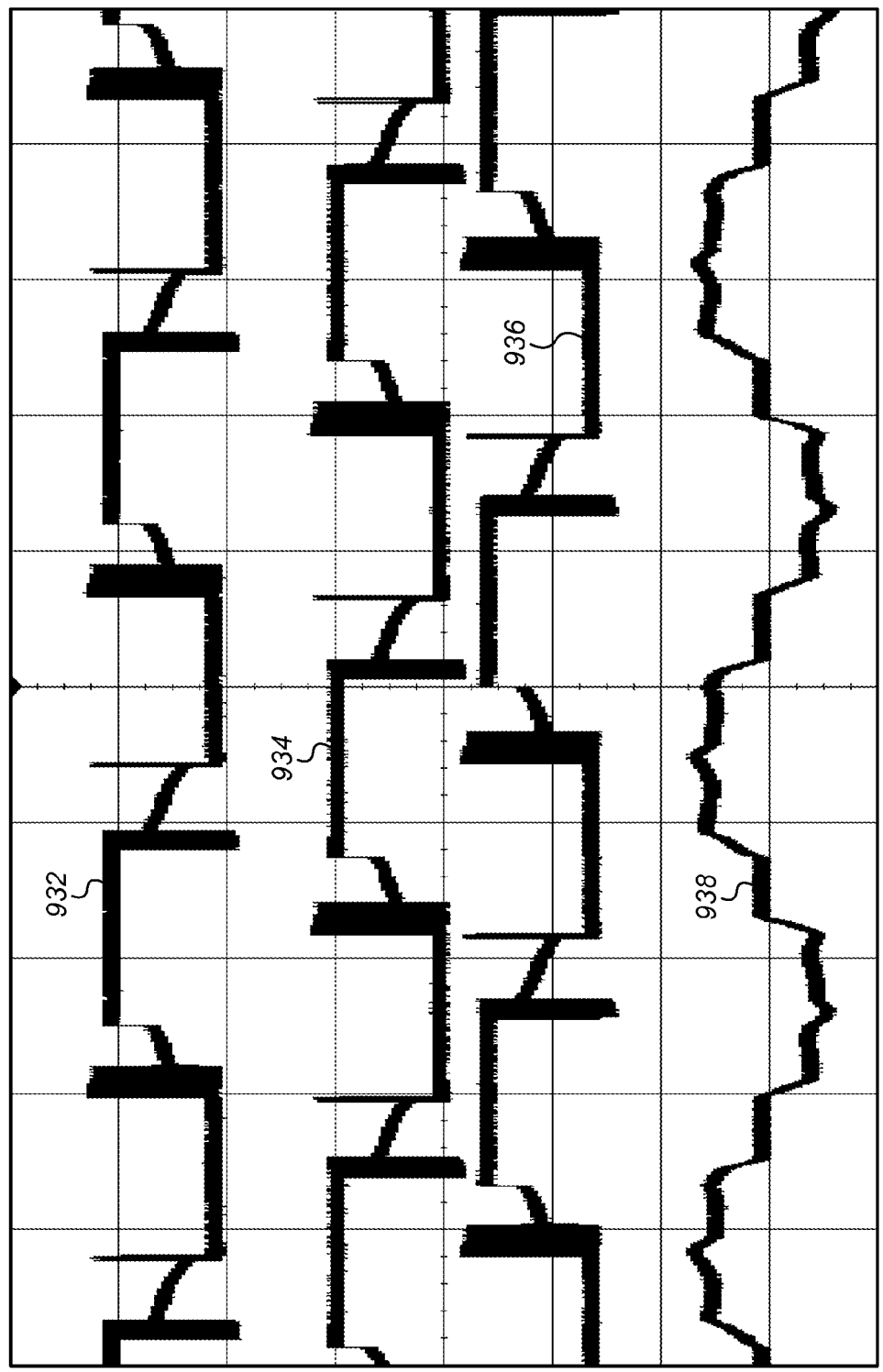
FIG. 11 shows the effects on the coil current when the control signals of the electromagnets are overlapped while a characteristic of the control signals is simultaneously adjusted, according to one embodiment.

FIG. 11 shows the effects on the coil current when the control signals of the electromagnets are overlapped while a characteristic of the control signals is simultaneously adjusted, (e.g. by adjusting the respective duty-cycles of the PWM signals powering the transistors), according to one embodiment. Traces 932, 934 and 936 represent the drive waveforms at the three coil terminals (e.g. at the three terminals 505, 515, and 525 shown in FIG. 5), respectively, while trace 938 represents the current in one of the represented phases. As seen in FIG. 11, when contrasted with any (or all) of the current waveforms (802, 804 and 806) of FIG. 8, current waveform 938 shows smoother edges, with no sudden change in the direction of the current apparent at any location on the current waveform. Because current 938 doesn't exhibit sudden changes in direction, there are no instant changes in torque, which may minimize the acoustics that may be generated from harmonics.

Figure 14:
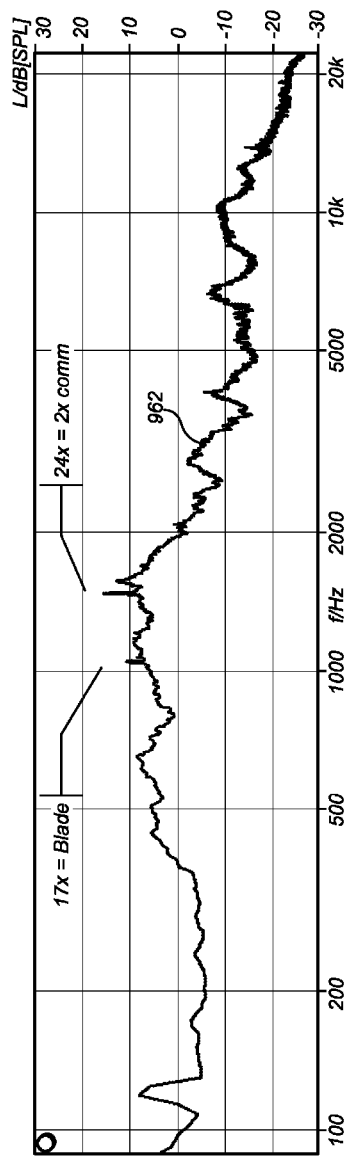
FIG. 14 shows the vibration signature associated with the signals of FIG. 11, according to one embodiment.

The vibration signature 962 associated with the signals of FIG. 11 is shown in FIG. 14, and indicates that only the primary commutation (24x) and blade pass (17x) frequencies remain, when contrasted with the vibration signature in FIG. 12. In other words, all the blade harmonics and most of the commutation harmonics have been successfully eliminated.

As detailed above, this effect has been achieved without driving a sinusoidal current, driving instead a trapezoidal current, with the commutation spikes being managed through controlling a characteristic of the control signal while overlapping the control signals with respect to the commutation command. In one set of embodiments, this is achieved by adjusting the respective duty-cycles of the PWM control signals of the transistors during the overlapping, which itself may be achieved by delaying the off-times and/or the on-times of control signals of the transistors. This makes it possible to obtain more output for the same size motor, if the magnetization of the permanent magnets takes advantage of the trapezoidal drive.

Overall, controlling a characteristic of the control signal while overlapping the control signals with respect to the commutation command provides the benefits of a sinusoid current without the loss in efficiency due to the increase in power consumption accompanying an unchanging RPM. By creating sinusoidal current only during the switching periods, the vibration/acoustic signature may be reduced, and because the phase coil current is zero only for relatively small periods of time, the power consumption may be reduced. In one set of embodiments, a differential wave shape may be used to drive the coils on and off symmetrically, generating a sinusoidal response while maintaining a relatively long period of time when the phase current is zero.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for operating a motor, wherein the motor comprises a plurality of electromagnets configured around a rotor, the method comprising:

controlling each electromagnet of the plurality of electromagnets through a respective drive transistor pair, wherein at least one respective drive transistor pair is enabled at any point in time to energize its corresponding electromagnet;

determining a present position of the rotor;

controlling each respective drive transistor pair according to said determining;

overlapping on-times and off-times of the respective drive transistor pairs with respect to a commutation command operative to switch from a first electromagnet of the plurality of electromagnets to a second electromagnet of the plurality of electromagnets, wherein the first electromagnet is energized and the second electromagnet is not energized, wherein switching from the first electromagnet to the second electromagnet is performed to de-energize the first electromagnet and to energize the second electromagnet, and wherein said overlapping is performed by delaying one or more of:

the on-times of the respective drive transistor pairs; or the off-times of the respective drive transistor pairs; and adjusting the on-times and off-times of the respective drive transistor pairs during said overlapping such that respective currents in the first electromagnet and in the second electromagnet are prevented from changing direction while switching from the first electromagnet to the second electromagnet.

2. The method of claim 1, wherein said determining is performed using one of:

un-energized electromagnets as magnetic sensors; and

Hall sensors configured in the motor.

3. The method of claim 1, wherein said delaying comprises delaying by a specified number of cycles of a switching clock.

4. The method of claim 1, wherein the plurality of electromagnets are connected in a Y-configuration.

5. The method of claim 1, wherein adjusting the on- and off-times is performed using a digital timer.

6. A method for operating a motor, wherein the motor comprises a plurality of electromagnets configured around a rotor, the method comprising:
controlling each electromagnet of the plurality of electromagnets through a respective drive transistor pair, wherein at least one respective drive transistor pair is enabled at any point in time to energize its corresponding electromagnet, wherein the respective drive transistor pairs are connected in a full H-bridge configuration;
determining a present position of the rotor;
controlling each respective drive transistor pair according to said determining;
overlapping on-times and off-times of the respective drive transistor pairs with respect to a commutation command operative to switch from a first electromagnet of the plurality of electromagnets to a second electromagnet of the plurality of electromagnets, wherein the first electromagnet is energized and the second electromagnet is not energized, and wherein switching from the first electromagnet to the second electromagnet is performed to de-energize the first electromagnet and to energize the second electromagnet; and
adjusting the on-times and off-times of the respective drive transistor pairs during said overlapping to prevent respective currents in the first electromagnet and in the second electromagnet from changing direction while switching from the first electromagnet to the second electromagnet.

7. A method for operating a motor, wherein the motor comprises a plurality of electromagnets configured around a rotor, the method comprising:
providing a respective drive signal to each electromagnet of the plurality of electromagnets to energize at least one electromagnet of the plurality of electromagnets at any point in time, wherein a respective drive transistor pair is controlled for each electromagnet of the plurality of electromagnets to generate the respective drive signals; and
switching, responsive to a commutation command, from a first electromagnet of the plurality of electromagnets that is energized to a second electromagnet of the plurality of electromagnets that is not energized, to de-energize the first electromagnet and energize the second electromagnet, wherein said switching comprises:
overlapping the respective drive signals provided to the first electromagnet and the second electromagnet, to keep the first electromagnet at least partially energized until the second electromagnet is at least partially energized, wherein said overlapping comprises delaying one of:
the off-time of the respective pair of transistors for the first electromagnet; or
the on-time of the respective pair of transistors for the second electromagnet; and
adjusting the respective drive signals during said overlapping to prevent respective currents in the first electromagnet and in the second electromagnet from changing direction while switching from the first electromagnet to the second electromagnet.

8. The method of claim 7, further comprising keeping at least one electromagnet of the plurality of electromagnets un-energized for at least a portion of a time period when remaining ones of the plurality of electromagnets are energized.

9. The method of claim 8, further comprising determining a present position of the rotor using the at least one of the plurality of electromagnets that is un-energized.

10. The method of claim 9, further comprising issuing the commutation command based on said determining.

11. The method of claim 7, wherein said controlling comprises providing a respective pulse-width modulated (PWM) control signal to each drive transistor of each respective drive transistor pair;
wherein said adjusting the respective drive signals comprises adjusting one or more of the respective PWM control signals.

12. A method for operating a motor, wherein the motor comprises a plurality of electromagnets configured around a rotor, the method comprising:
providing a respective drive signal to each electromagnet of the plurality of electromagnets to energize at least one electromagnet of the plurality of electromagnets at any point in time; and
switching, responsive to a commutation command, from a first electromagnet of the plurality of electromagnets that is energized to a second electromagnet of the plurality of electromagnets that is not energized, to de-energize the first electromagnet and energize the second electromagnet, wherein said switching comprises:
overlapping the respective drive signals provided to the first electromagnet and the second electromagnet, to keep the first electromagnet at least partially energized until the second electromagnet is at least partially energized, wherein a duration of said overlapping is dynamically controlled using digital timers, and
adjusting the respective drive signals during said overlapping to prevent respective currents in the first electromagnet and in the second electromagnet from changing direction while switching from the first electromagnet to the second electromagnet.

13. A system comprising:
a motor comprising:
a rotor configured to rotate around an axis; and
a plurality of electromagnets configured around the rotor to provide an electromagnetic force to rotate the rotor;
a drive circuit configured to provide a respective drive signal to each electromagnet of the plurality of electromagnets to energize at least one electromagnet of the plurality of electromagnets at any point in time and comprising a respective drive transistor pair for each electromagnet of the plurality of electromagnets to generate the respective drive signals; and
a drive control block configured to control the drive circuit to switch from a first electromagnet of the plurality of electromagnets that is energized to a second electromagnet of the plurality of electromagnets that is not energized, to de-energize the first electromagnet and energize the second electromagnet;
wherein the drive control block is further configured to overlap the respective drive signals provided to the first electromagnet and the second electromagnet, to keep the first electromagnet at least partially energized until the second electromagnet is at least partially energized, wherein to overlap the respective drive signals provided to the first electromagnet and the second electromagnet, the drive control block is configured to perform one of:
delay the off-time of the respective pair of transistors for the first electromagnet; and delay the on-time of the respective pair of transistors for the second electromagnet; and wherein drive control block is further configured to adjust the respective drive signals while overlapping the respective drive signals to prevent respective currents in the first electromagnet and in the second electromagnet from changing direction while switching from the first electromagnet to the second electromagnet.

14. The system of claim 13, wherein the drive control block is further configured to:

keep at least one electromagnet of the plurality of electromagnets un-energized for at least a portion of a time period when remaining ones of the plurality of electromagnets are energized; and determine a present position of the rotor based on an induced voltage in the at least one of the plurality of electromagnets that is un-energized.

15. The system of claim 14, wherein the drive control block is further configured to switch from the first electromagnet to the second electromagnet based on the determined present position of the rotor.

16. The system of claim 13, wherein to control the drive circuit, the drive control block is further configured to provide a respective pulse-width modulated (PWM) control signal to each drive transistor of each respective drive transistor pair to control respective on-times and off-times of each drive transistor.

17. The system of claim 13, wherein the drive control block is configured to dynamically control a duration of the overlap of the respective drive signals provided to the first electromagnet and the second electromagnet.

18. The system of claim 13, wherein the motor and the drive circuit are configured in a single motor casing.

19. The system of claim 18, wherein the drive control block is also comprised in the single motor casing.

20. The system of claim 13, wherein the drive circuit and the drive control block are configured on an integrated circuit.

21. The system of claim 20, comprising a digital timer operable to adjust the respective drive signals.

22. The system of claim 13, comprising a digital timer operable to adjust the on- and off-times.

23. A system comprising:

a motor comprising:
a rotor configured to rotate around an axis; and
a plurality of electromagnets configured around the rotor to provide an electromagnetic force to rotate the rotor;

a drive circuit configured to provide a respective drive signal to each electromagnet of the plurality of electromagnets to energize at least one electromagnet of the plurality of electromagnets at any point in time; and a drive control block configured to control the drive circuit to switch from a first electromagnet of the plurality of electromagnets that is energized to a second electromagnet of the plurality of electromagnets that is not energized, to de-energize the first electromagnet and energize the second electromagnet, wherein the drive control block comprises digital timers configured to control a duration of the overlap of the respective drive signals provided to the first electromagnet and the second electromagnet, wherein the drive control block is further configured to overlap the respective drive signals provided to the first electromagnet and the second electromagnet, to keep the first electromagnet at least partially energized until the second electromagnet is at least partially energized; and wherein drive control block is further configured to adjust the respective drive signals while overlapping the respective drive signals to prevent respective currents in the first electromagnet and in the second electromagnet from changing direction while switching from the first electromagnet to the second electromagnet.

\* \* \* \* \*